(12) United States Patent
Reimelt et al.

(10) Patent No.: US 6,928,867 B2
(45) Date of Patent: Aug. 16, 2005

(54) DEVICE FOR DETERMINING AND/OR MONITORING THE LEVEL OF A FILLED SUBSTANCE IN A CONTAINER

(75) Inventors: Ralf Reimelt, Freiburg (DE); Herbert Schroth, Schopfheim (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 0 days.

(21) Appl. No.: 10/469,161
(22) PCT Filed: Dec. 14, 2001
(86) PCT No.: PCT/EP01/14790
§ 371 (c)(1),
(2), (4) Date: Mar. 29, 2004
(87) PCT Pub. No.: WO02/068913
PCT Pub. Date: Sep. 6, 2002

(65) Prior Publication Data
US 2004/0154392 A1 Aug. 12, 2004

(30) Foreign Application Priority Data
Feb. 27, 2001 (DE) .......................... 101 09 453

(51) Int. Cl.[7] .......................... G01F 23/00; G01S 13/00
(52) U.S. Cl. .................................... 73/290 V; 342/124
(58) Field of Search .................. 73/290 V, 304 R; 340/621; 367/908; 342/124

(56) References Cited

U.S. PATENT DOCUMENTS

| 3,995,212 A | | 11/1976 | Ross | |
| 4,566,321 A | * | 1/1986 | Zacchio | 73/290 V |
| 4,641,139 A | * | 2/1987 | Edvardsson | 342/124 |
| 5,438,867 A | | 8/1995 | van der Pol | |
| 5,594,449 A | | 1/1997 | Otto | |
| 5,689,265 A | * | 11/1997 | Otto et al. | 342/124 |
| 6,054,946 A | * | 4/2000 | Lalla et al. | 342/124 |
| 6,229,476 B1 | * | 5/2001 | Lutke et al. | 342/124 |
| 6,278,411 B1 | * | 8/2001 | Ohlsson et al. | 343/772 |
| 6,452,467 B1 | * | 9/2002 | McEwan | 333/240 |
| 6,681,626 B2 | * | 1/2004 | Funfgeld | 73/290 V |
| 2002/0154052 A1 | * | 10/2002 | Fehrenbach et al. | 342/124 |

FOREIGN PATENT DOCUMENTS

| DE | 43 36 494 C2 | 4/1995 |
| DE | 44 04 745 A1 | 8/1995 |
| DE | 44 04 745 C2 | 8/1995 |
| DE | 44 07 823 C2 | 9/1995 |
| EP | 0 534 654 A2 | 3/1993 |

* cited by examiner

Primary Examiner—Hezron Williams
Assistant Examiner—Tamiko Bellamy
(74) Attorney, Agent, or Firm—Bacon & Thomas

(57) ABSTRACT

The invention concerns a device for determining and/or monitoring the fill level of a fill material in a container with a transmitting-/receiving-unit, which produces and receives high frequency measurement signals, and an evaluation/control-unit, which determines the fill level of the fill material in the container on the basis of the travel time of the high frequency measurement signals. High frequency measurement signals are guided along a conductive element. The coupling onto, and from, element is done by a coupling unit. The device is secured at the container using an attachment part placed above the maximum fill level to be measured and/or monitored in the upper region of the conductive element, a horn-shaped element is arranged such that its lower opening area facing in the direction toward the surface of the fill material lies approximately in the plane of the attachment part.

14 Claims, 4 Drawing Sheets

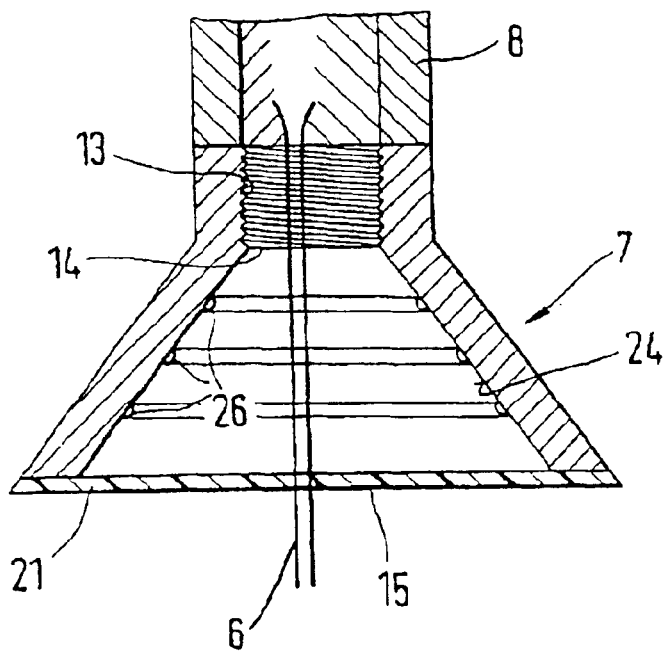
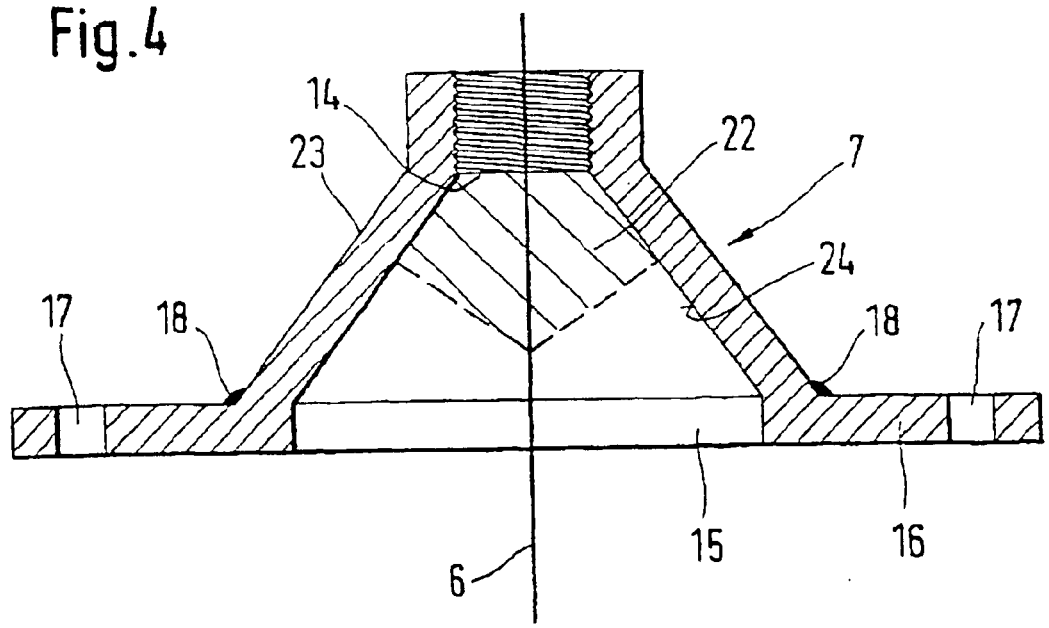

DEVICE FOR DETERMINING AND/OR MONITORING THE LEVEL OF A FILLED SUBSTANCE IN A CONTAINER

TECHNICAL FIELD

The invention relates to a device for determining and/or monitoring the fill level of a fill material in container.

BACKGROUND OF THE INVENTION

Devices for measuring the fill level of a fill material in a container by means of measurement signals guided along a conductive element are already known from the state of the art. As an example of a measurement apparatus, which determines the fill level using the travel time of high frequency measurement pulses (-TDR-method), the LEVELFLEX may be named, an apparatus marketed and sold by the applicant. Also known are FMCW-measurement apparatuses, which determine fill level on the basis of frequency modulated, continuous, electromagetic waves. A measurement apparatus and method, by which the fill level can be established, are known, for example from EP 1 020 735 A2.

Measurement apparatuses of the above-named type are usually secured to the container with a screw thread or a flange. During installation, it must be assured that the measurement apparatus is placed above the maximum fill level to be measured.

The coupling of the measurement signals from the transmitting unit to the conductive element and from the conductive element into the receiving unit occurs over a coupling unit, which is so structured that disturbance echo signals arising from impedance jumps in transition regions are kept as small as possible. Problematic in this is, among other things, that the coupling unit has a relatively small opening area. Due to the small opening area, on the one hand, an impedance jump occurs, which leads to an undesired reflection during emission of the measurement signals; on the other hand, the small opening area distorts the electric field, so that, besides exciting undesired oscillation modes, which exhibit a marked radiation characteristic in the direction of the fill material, also modes are produced, which have an undesired lateral radiation. As a result of the lateral radiation of the measurement signals, the signal/noise ratio can degrade considerably, depending on the details of the application. Besides this, following reflection of the measurement signal at the surface of the fill material, only that part of the returning wave which lies within the opening area of the coupling unit is coupled back into the transmitting-/receiving-unit.

In order to remove this undesirable situation and achieve an efficient exciting of the desired modes of the measurement signals on the conductive element, it is already known to use a horn-shaped element. This horn-shaped element is placed in the upper region of the conductive element and protrudes into the container in which the fill level is to be measured. Such a fill level measurement apparatus is described, for example, in DE 44 04 745 C2. The funnel-shaped element is supposed to care for optimizing the guiding of the measurement signal in the direction of the surface of the fill material. However, in using a funnel-shaped element, the radiation is only optimized when the wave length of the measurement signals is small relative to the diameter of the lower opening area of the horn-shaped element. If the wave length has the same order of magnitude as the diameter of the ham-shaped element, then no marked directional characteristic occurs in the travel direction of the measurement signals. Quite the contrary, a part of the energy travels back on the outer surface of the horn-shaped element, and gets reflected at the coupling unit, at the container wall, the flange or other obstacle, whereby relatively strong disturbing echos are caused. Consequently, in a large number of applications, the measurement results are actually degraded by the use of the horn-shaped element.

SUMMARY OF THE INVENTION

The object of the invention is to optimize the coupling of measurement signals in a fill level measurement apparatus with guided measurement signals.

The object is solved in that a transmitting-/receiving-unit is provided, which produces and receives high frequency measurement signals, and that an evaluation-/control-unit is provided, which determines the fill level of the fill material in the container on the basis of the travel time of the high frequency measurement signals. Additionally, a conductive element is provided, on which the high frequency measurement signals and the reflected measurement signals are guided. A coupling unit couples the measurement signals onto the conductive element and the reflected measurement signals into the transmitting-/receiving-unit. The device is placed above the maximum of the fill level to be measured and/or monitored with the use of an attachment part. Additionally, a horn-shaped element is provided in the upper region of the conductive element. The horn-shaped element is arranged such that its lower opening area facing the surface of the fill material lies approximately in the plane of the attachment part.

Relative to the state of the art, the device of the invention has the following advantages:

- The lower opening area of the horn-shaped element is enlarged compared to that of a usual coupling. Because of this, the portion of the high frequency energy transformed into the desired wave guide mode, and then transformed back, is increased. As a result of this, the amplitude of the useful signal—thus the echo signal that represents the fill level of the fill material in the container—gets bigger.
- Due to lessened field distortion, lateral radiation is decreased. Consequently, disturbances by echos on internal installations and the container walls are considerably reduced.
- In the case of installation in a nozzle, longitudinal and transverse resonances, which especially limit measurability and accuracy at close range, are decreased. Longitudinal resonances are reduced, because a smaller part of the energy is reflected at the coupling, and, consequently, the quality of the longitudinal resonances sinks. Transverse resonances are lessened, because the field distortion is lowered, and, consequently, a smaller part of the energy is radiated perpendicular to the axis of the wave guide.
- The impedance jump at the transition to the surface wave guide is smaller. As a result of this, the usually associated reflections and, consequently, the disturbing echos, are reduced in size. Such reflection signals can even be superimposed on the existing useful signal and limit especially the measurability and measurement accuracy at close range. As a term of art, 'block distance' is referenced at this location.
- In comparison to a horn projecting into the container, a horn-shaped element which is basically applied outside does not restrict the measurement range.

In the case of mounting the device of the invention on a bypass, the material flow through the lateral outlet is not hindered by the horn-shaped element.

According to an advantageous further development of the device of the invention, the upper opening area of the horn-shaped element is smaller than the lower opening area. This is achieved, for example, in that the lateral walls of the horn-shaped element steadily (exponentially, conically, etc.) or stepwise get larger in moving from the plane of the upper opening area to the lower opening area. The angle of inclination can, in principle, be any angle in the range greater than zero degrees and smaller than or equal to 90 degrees. Thus, a preferred further development of the device of the invention provides that the flange itself is machined out and exhibits a more or less horn-shaped structure on the container wall. Since the flange then simultaneously assumes the task of the horn-shaped element, this saves both material and costs.

Another advantageous embodiment of the device of the invention provides that the lateral walls of the horn-shaped element exhibit a smooth or a structured inner surface for forced development of the desired modes.

According to an especially favorable further development of the device of the invention, the attachment element is provided in the form of a plate. The plate has an opening, whose area approximates that of the lower opening area of the horn-shaped element. The plate can be e.g. the upper surface of a container nozzle, the upper surface of the container or a flange, by way of which the device can be secured to the container. Attachment of the lower end of the horn-shaped element on the plate, or attachment element, can be done by way of a welded, soldered or brazed, riveted, screwed or adhesive connection. Also, the lower end of the horn-shaped element can be given a complementary incline or shape, when the mounting is to be done e.g. on an inclined tank lid.

If the attachment is e.g. a screwed connection, then an external or internal thread can be provided in the area of the horn end. The threaded portion is then, for example, screwed into or onto a sleeve. Also, a flange can be present at the horn end, so that the horn can be screwed directly onto the container or onto a nozzle, a bypass or a surge tube. Direct screwing onto the container is, for example, expedient in the case of plastic containers, since, among other advantages, the tension forces get transferred onto a relatively large area of the container in this type of connection.

An especially preferred embodiment of the device of the invention is one where the flange and the horn-shaped element are provided as an integral unit. Also, the horn-shaped element can have a sheet metal unit attached to it, which is then subsequently clamped between two flanges for purposes of attaching the horn-shaped element to the container.

It is also considered to be very advantageous, when the device has an at least partially modular construction.

An advantageous embodiment of the device of the invention is one in which the device can be attached on a surge tube, a bypass, or a nozzle. In particular, then the lower dimensions of the opening area of the horn-shaped element correspond approximately to the dimensions of the opening area of the surge tube or bypass or nozzle. The forming of disturbing echoes is in this way effectively blocked or at least then limited to a tolerable level.

It is understood that it is also possible to standardize the dimensions of the opening area and that the fitting onto the given surge tube or bypass is then done using e.g. differently dimensioned flanges.

To prevent a plugging of the interior of the horn-shaped element with fill material, a further development of the device of the invention provides that the interior of the horn-shaped element is at least partially filled with a dielectric material. In particular, the dielectric material is tapered in the direction of the fill material, thus on the fill material side. This, on the one hand, improves tuning in the coupling/uncoupling of the measurement signals onto the conductive element/from the conductive element; on the other hand, the dripping away of condensate is facilitated.

When no large pressure differences between the inner and outer regions of the horn-shaped element are to be expected, it is also possible to close the horn-shaped element approximately in the region of its lower opening area with a dielectric plate; for example, a Fresnel lens can be used here.

BRIEF DESCRIPTION OF THE DRAWINGS

The invention is explained in greater detail on the basis of the following drawings, which show as follows:

FIG. 3: a first embodiment of the attachment of horn-shaped element and container, FIG. 4: a second embodiment of the attachment of horn-shaped element and container.

DETAILED DESCRIPTION OF THE PREFERRED EMBODIMENT

Figure 1:
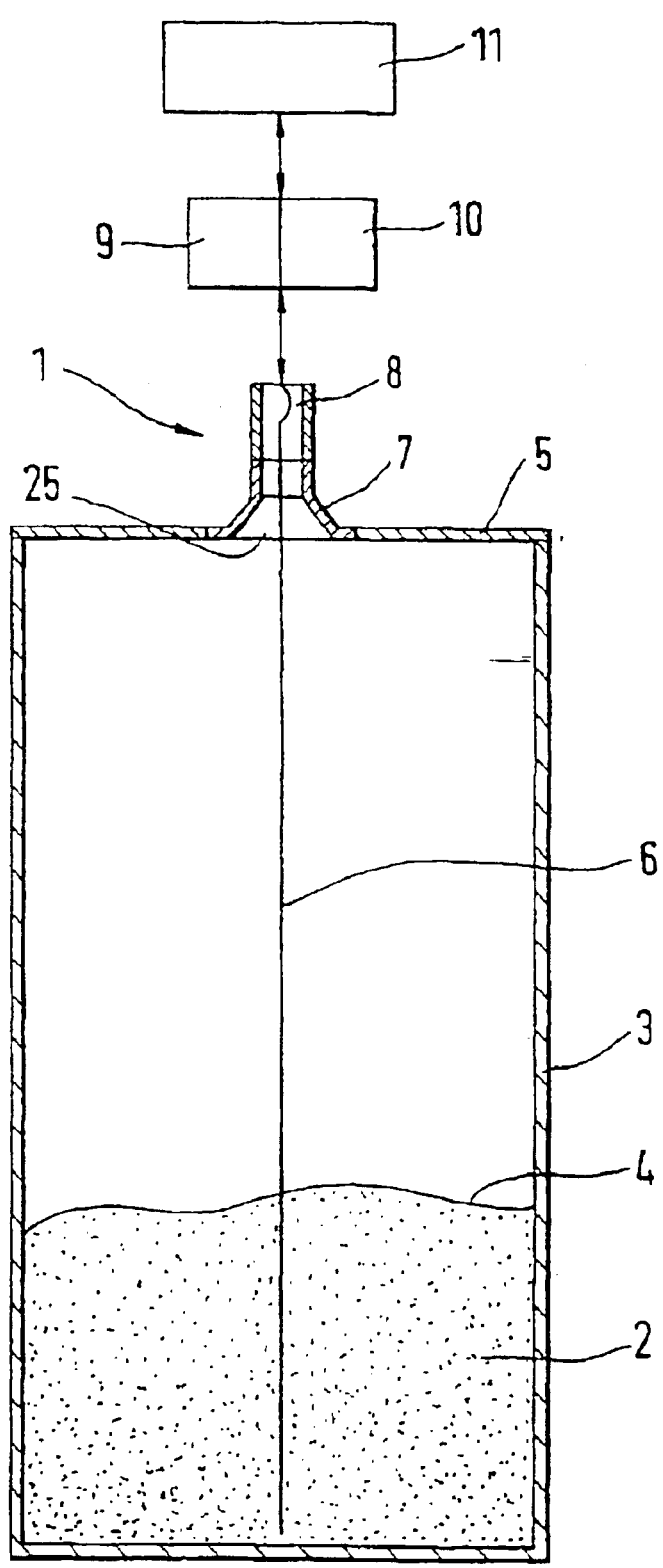
FIG. 1: a schematic representation of the device of the invention.

FIG. 1 shows a schematic representation of the device 1 of the invention. High frequency measurement signals are produced in the transmitting unit 9 and coupled over the coupling unit 8 onto the conductive element 6 in certain intervals predetermined by the control-/evaluation unit 8. The measurement signals are reflected at the surface 4 of the fill material 2 and enter over the coupling unit 8 into the receiving unit 10. Using the travel time of the measurement signals reflected at the surface 4 of the fill material 2, the control-/evaluation unit 11 establishes the fill level of the fill material 2 in the container 3. A corresponding measurement apparatus and method, by which the fill level can be established, are known, for example, from EP 1 020 735 A2.

The device 1, a TDR measurement apparatus, is secured in an opening 25 in the lid 5 of the container 3. It is understood that, instead of the lid 5 of the container 3, the attachment of the measurement apparatus 1 can be done also in the region of the upper, outer surface of a nozzle. According to the invention, the high frequency measurement signals are guided over a horn-shaped element 7 onto the conductive element 6. The lower opening area 15 facing in the direction onto the surface 4 of the fill material 2 lies approximately in the plane of the preferably plate-shaped attachment part, here the lid 5.

According to an advantageous further development of the device 1 of the invention, the upper opening area 14 of the horn-shaped element 7 is smaller than the lower opening area 15. This is achieved, for example by having the side walls of the horn-shaped element get steadily, thus, for example exponentially or conically, or step wise, larger in moving from the plane of the upper opening area 14 to the lower opening area 15. Additionally, the preferred embodiment of the device of the invention is represented in FIG. 1, in which the side walls of the horn-shaped element 7 exhibit a smooth or a structured inner surface, whereby the propagation of preferred modes is compelled.

According to an advantageous embodiment of the device 1 of the invention, the horn-shaped element 7 can be completely or partially filled with a dielectric material 22 (see FIG. 4). The dielectric material 22 prevents plugging of the horn-shaped element 7 with fill material 2. It is, in this connection, also expedient to taper the dielectric material 22 on the container side. This both improves the fit and facilitates dripping of condensate away. Furthermore, the device 1 of the invention shown in FIG. 1 can have a Fresnel lens closing the lower opening area 15 of the horn-shaped element 7. This solution shown in FIG. 3 is expedient, when no large pressure differences are to be expected between the inner and outer surfaces of the dielectric plate 21.

For predetermined useful signal spectrum and predetermined diameter, there is an optimum length, at which the best fit, i.e. an optimum coupling of the energy between the coupling unit and the conductive element, is achieved. For example, the diameter of the lower opening area 15 can amount to 100 mm in the case of measurement signals in the frequency range between 200 MHz and 1.5 GHz (this is the frequency range of the measurement signals used in a fill level measuring apparatus sold by the applicant under the designation Levelflex); in such case, a length of the horn-shaped element 7 of about 150 mm is optimum.

Figure 2:
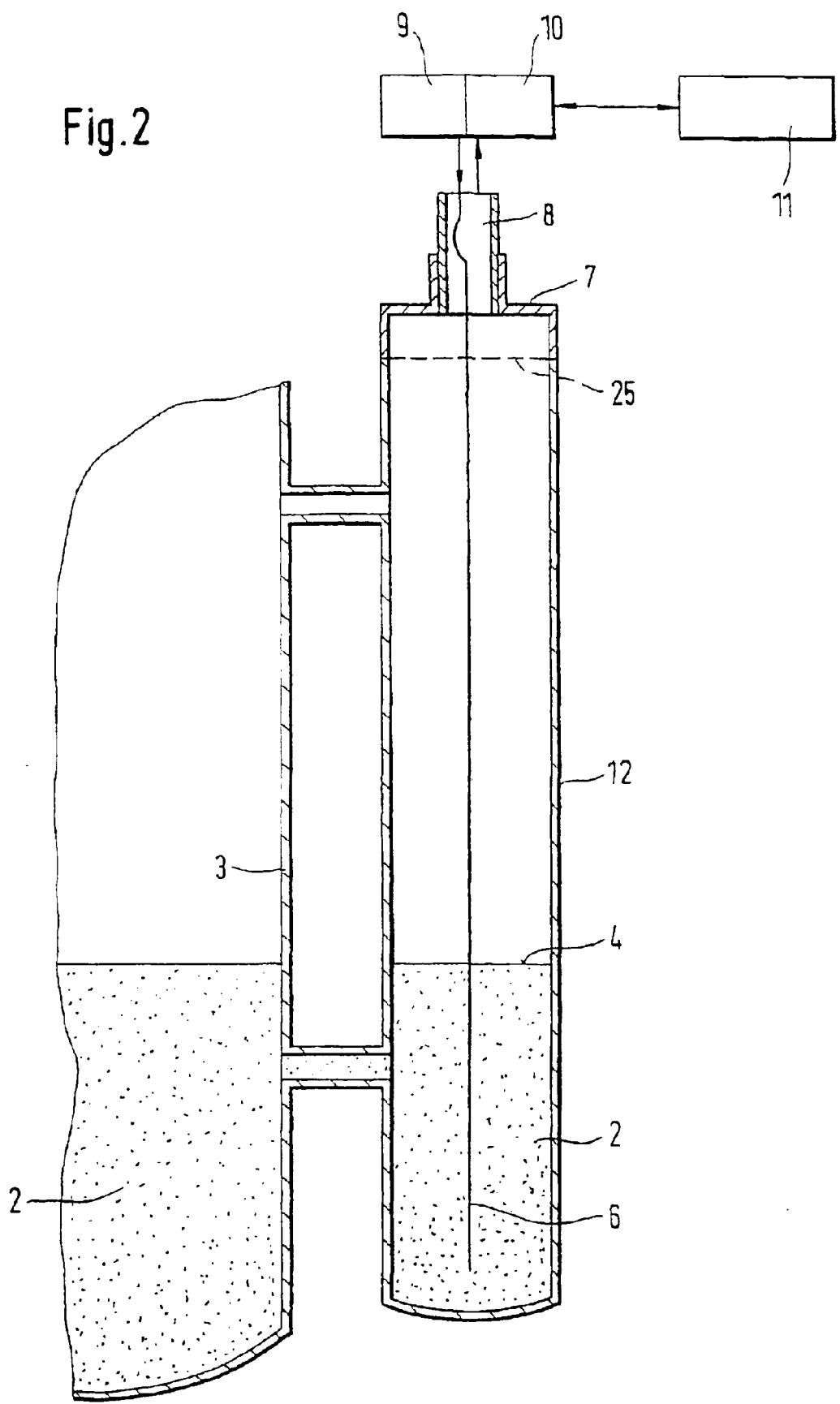
FIG. 2: a schematic representation of the device of the invention, attached at a bypass.

FIG. 2 is a schematic representation of one embodiment of the device 1 of the invention. The measurement apparatus in such case is secured in the upper region of a bypass 12. The dimensions of the horn-shaped element 7 are chosen such that the lower opening area 15 of the horn-shaped element 7 is essentially equal to the opening area of the bypass 12. This keeps the impedance nearly constant; there are practically no reflections in the region of the coupling. Consequently, a fill level measurement can be performed almost right up to the lower opening area 15 of the horn-shaped element 7, so that it first becomes possible to apply a measurement apparatus, which establishes fill level on the basis of travel time of guided measurement signals, as an overfill guard.

The lower opening area 15 of the horn-shaped element 7 can thus be fitted to a determined nozzle, bypass or surge tube diameter, in order to achieve a highest possible efficiency. For cost savings, it is, however, also possible to provide a universal dimensioning of the lower opening area of the horn-shaped element 7, for example DN 100, and attach that horn-shaped element 7 using flanges of different diameters.

As already mentioned, the mounting of the measurement apparatus can be done on a bypass 12, a nozzle or a surge tube. Surge tubes are also preferably used, when highly accurate measurements capable of being used as standards are to be carried out.

FIGS. 3 to 6 present different embodiments for the joining of a horn-shaped element 7 and an attachment part. These embodiments show the horn-shaped element 7 as a separate part. As a consequence of modular construction, there is the possibility of applying at least individual components, for example the horn-shaped element 7, universally for different applications and mountings. In these Figs., the horn-shaped element has an internal thread 13 for mounting of the coupling unit 8. Of course, the horn-shaped element 7 can also be an integral part of the coupling unit 8.

FIG. 3 additionally shows an off-center conductive element 6, thus not arranged on the axis of symmetry of the horn-shaped element 7. It has been found that the off-center arrangement of the conductive element 6 enables optimum coupling of the high frequency measurement signals.

It is to be noted that the off-centered arrangement of the conductive element 6 is in no way limited to the arrangement of the invention, in particular the arrangement of the horn-shaped element 7 relative to the attachment part 5. Rather, the off-centered arrangement is also advantageous when no horn-shaped element 7 at all is used or when the horn-shaped element 7 projects into the container 3 in which the fill level measurement is performed, as known from the state of the art.

Additionally, surface structures 26 are provided on the inner surface 24 of the side wall 23 of the horn-shaped element 7. These structures favor the propagation of preferred modes of the high frequency measurement signals. The lower opening area of the horn-shaped element 7 is closed by a dielectric plate 21. This plate 21 is, for example, a Fresnel lens.

FIG. 4 shows an especially favorable embodiment of the device 1 of the invention, in which the horn-shaped element 7 is an integral part of flange 16. As already mentioned above, this makes it possible to tune the horn-shaped element 7 and the coupling optimally to the relevant high frequency measurement signals, while the flange 16 can be given any dimension for securement to the chosen attachment part 5. Of course, it is also possible to join the flange 16 and the horn-shaped element using some type of connecting. The connecting can be done by welding, soldering or brazing, adhesive or by mechanical connection.

To prevent a plugging of the interior of the horn-shaped element 7 with fill material 2, a further development of the device 1 of the invention provides that the interior of the horn-shaped element 7 is filled at least partially with a dielectric material 22. On the one hand, this allows improvement of fit; on the other hand, dripping of condensate away is facilitated.

Figure 5:
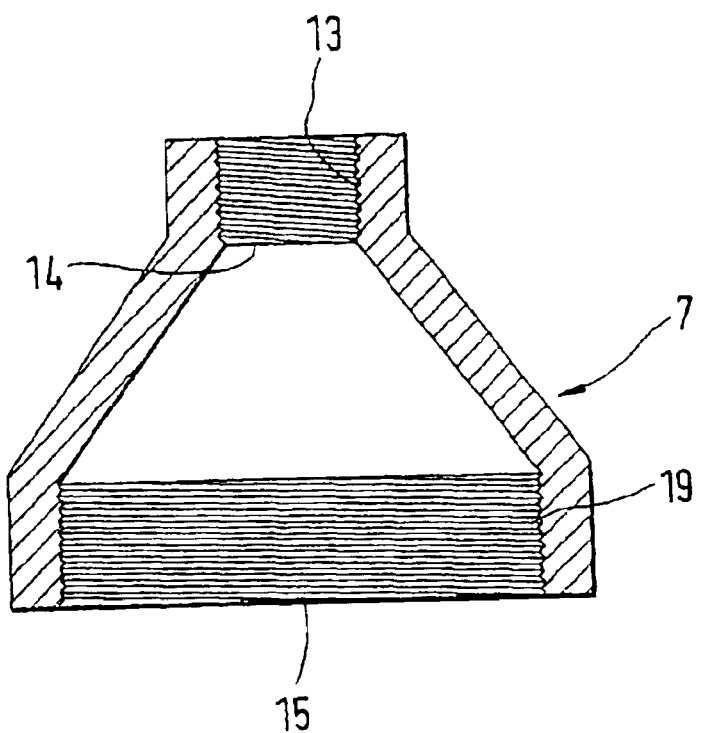
FIG. 5: a third embodiment of the attachment of horn-shaped element and container.
Figure 6:
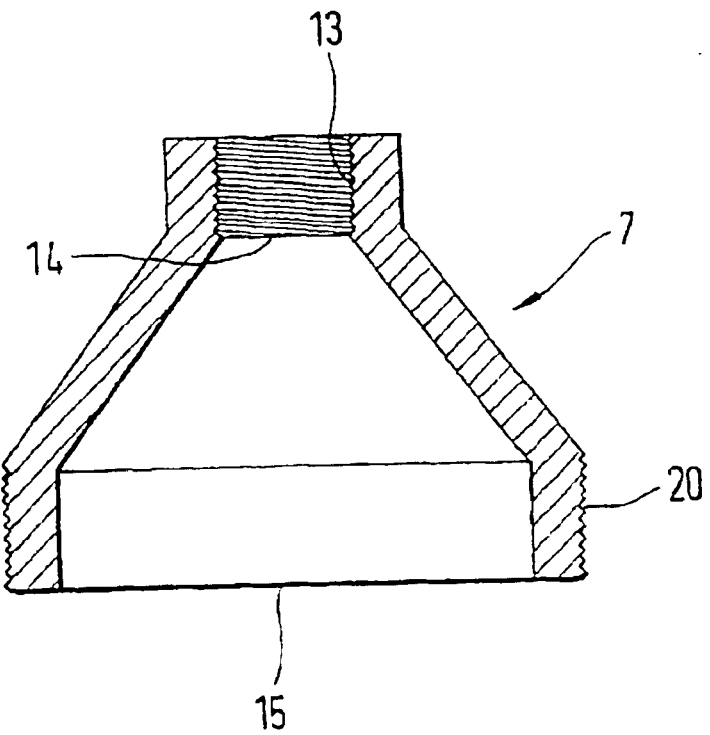
FIG. 6: a fourth embodiment of the attachment of horn-shaped element and container.

FIG. 5 shows a variant in which the connecting between the horn-shaped element 7 and the attachment part is accomplished by a threaded connection. For this purpose, the lower end of the horn-shaped element 7 is provided with an internal thread 19, which connects with a corresponding part, e.g. a sleeve, located on the attachment part 5. FIG. 6 shows an embodiment, in which the connection between the horn-shaped element 7 and the attachment part 5 is also done using a screwed connection - however, in this case, an outer thread 20 is arranged in the region of the lower end of the horn-shaped element 7.

What is claimed is:

1. A device for determining and/or monitoring the fill level of a fill material in a container, comprising:

a transmitting-/receiving-unit, which produces and receives high frequency, broad band measurement signals;

an evaluation-/control-unit, which determines the fill level of the fill material in the container on the basis of the travel time of the high frequency measurement signals reflected at the surface of the fill material in the container;

a conductive element, on which the high frequency measurement signals and the reflected measurement signals are guided;

a coupling unit, which couples the measurement signals onto said conductive element and the reflected measurement signals into said transmitting-/receiving-unit;

an attachment part, with which said device is secured above the maximum fill level to be measured and/or monitored; and a horn-shaped element in the upper region of said conductive element, said horn-shaped element defining a lower open area, and is arranged such that its lower opening area faces in the direction of the surface of the fill material and lies approximately in the plane of said attachment part.

2. The device as claimed in claim 1, wherein:

the upper opening area of said horn-shaped element is smaller than the lower opening area.

3. The device as claimed in claim 1, wherein:

the side walls or side wall of said horn-shaped element are constructed such that they increase steadily or stepwise from the plane of the upper opening area to the lower opening area.

4. The device as claimed in claim 1, wherein:

the side walls or side wall of said horn-shaped element exhibit one of: a smooth and a structured inner surface.

5. The device as claimed in claim 1, wherein:

said attachment element is formed as a plate, which has an opening, whose area is approximately equal to the lower opening area of said horn-shaped element.

6. The device as claimed in claim 5, wherein:

said attachment part is a flange, by way of which said device can be secured at the container.

7. The device as claimed in claim 5, wherein:

said flange and said horn-shaped element are formed as an integral unit.

8. The device as claimed in claim 1, wherein:

said device has an at least partially modular construction.

9. The device as claimed in claim 1, wherein:

said device is secured at one of: a surge tube, a bypass and a nozzle.

10. The device as claimed in claim 9, wherein:

the lower opening area of said horn-shaped element is approximately equal to the opening area of said one of: said surge tube said bypass, and said nozzle.

11. The device as claimed in claim 1, wherein:

the interior of said horn-shaped element is at least partially filled with a dielectric material.

12. The device as claimed in claim 11, wherein:

said dielectric material is tapered in the direction of the fill material.

13. The device as claimed in claim 1, wherein:

said horn-shaped element is closed approximately in the region of its lower opening area with a dielectric plate.

14. The device as claimed in claim 11, wherein:

said horn-shaped element is closed approximately in the region of its lower opening area with a dielectric plate.

* * * * *